US008422828B2

(12) United States Patent
Fukuda et al.

(10) Patent No.: US 8,422,828 B2
(45) Date of Patent: Apr. 16, 2013

(54) IMAGE PROCESSING APPARATUS AND IMAGE PROCESSING METHOD

(75) Inventors: Nobuhiro Fukuda, Tokyo (JP); Masahiro Ogino, Ebina (JP); Mitsuo Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 877 days.

(21) Appl. No.: 12/054,408

(22) Filed: Mar. 25, 2008

(65) Prior Publication Data

US 2008/0240562 A1    Oct. 2, 2008

(30) Foreign Application Priority Data

Mar. 27, 2007    (JP) .................................. 2007-080482

(51) Int. Cl.
*G06K 9/32*    (2006.01)

(52) U.S. Cl.
USPC ............ 382/300; 348/241; 348/700; 382/190

(58) Field of Classification Search .................. None
See application file for complete search history.

(56) References Cited

U.S. PATENT DOCUMENTS

| | | | | |
|---|---|---|---|---|
| 5,483,296 | A * | 1/1996 | Nonweiler | 348/719 |
| 5,883,678 | A | 3/1999 | Yamaguchi et al. | |
| 6,008,865 | A * | 12/1999 | Fogel | 348/700 |
| 7,271,814 | B2 * | 9/2007 | Anwar et al. | 345/629 |
| 7,710,498 | B2 * | 5/2010 | Kondo et al. | 348/441 |
| 2002/0009141 | A1 | 1/2002 | Yamaguchi et al. | |
| 2003/0044072 | A1 * | 3/2003 | Kaneko et al. | 382/190 |
| 2005/0017986 | A1 * | 1/2005 | Anwar et al. | 345/629 |
| 2007/0030342 | A1 * | 2/2007 | Wilburn et al. | 348/47 |
| 2007/0040918 | A1 * | 2/2007 | Kondo et al. | 348/241 |
| 2008/0007614 | A1 | 1/2008 | Mizuhashi et al. | |
| 2008/0008243 | A1 * | 1/2008 | Ozdemir | 375/240.16 |
| 2009/0231314 | A1 * | 9/2009 | Hanaoka et al. | 345/208 |
| 2010/0091185 | A1 * | 4/2010 | Ueno et al. | 348/452 |
| 2010/0272184 | A1 * | 10/2010 | Fishbain et al. | 375/240.16 |

FOREIGN PATENT DOCUMENTS

| | | |
|---|---|---|
| JP | 10-145797 | 5/1998 |
| JP | 2000-324501 | 11/2000 |
| JP | 2006-165602 | 6/2006 |

* cited by examiner

*Primary Examiner* — Tsung-Yin Tsai
(74) *Attorney, Agent, or Firm* — Antonelli, Terry, Stout & Kraus, LLP.

(57) ABSTRACT

Image processing apparatus and image processing method including an image separation processing section for separating an inputted image signal into a transparent image portion having transparency and a background image by detecting a pixel data common among a plurality of frames within the inputted image signal; a frame interpolator that performs frame interpolation using the separated background image; and a composition processing section for combining the frame-interpolated background image with the separated transparent image portion, wherein the frame interpolation is performed only to the background image so that the influence on the frame interpolation of the transparent image portion is reduced.

18 Claims, 15 Drawing Sheets

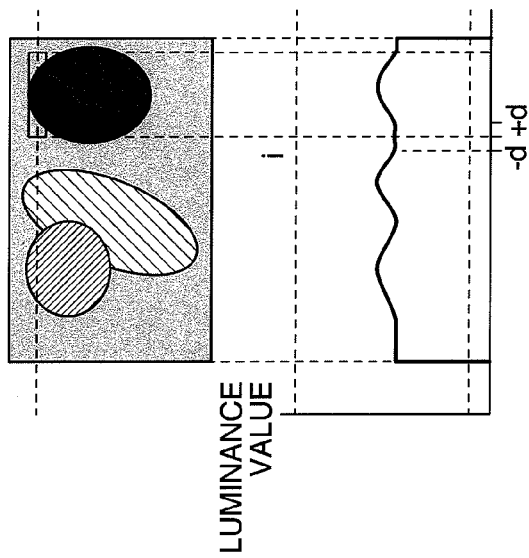
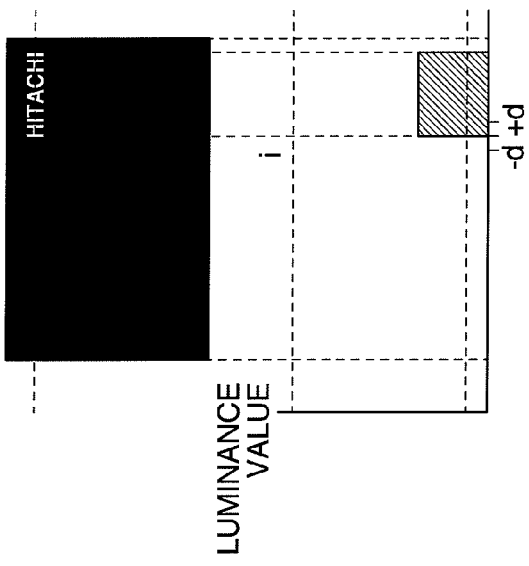
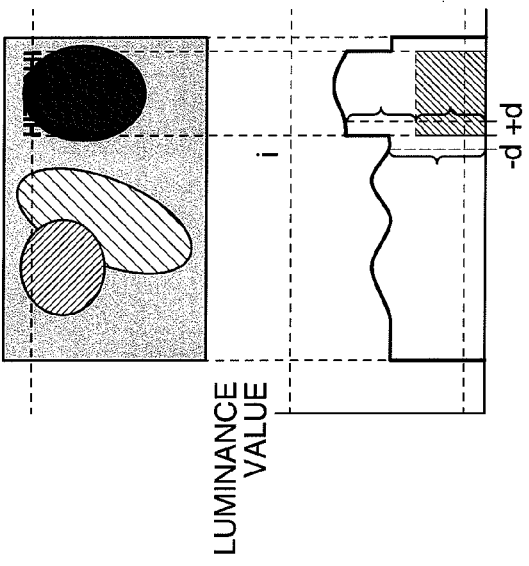

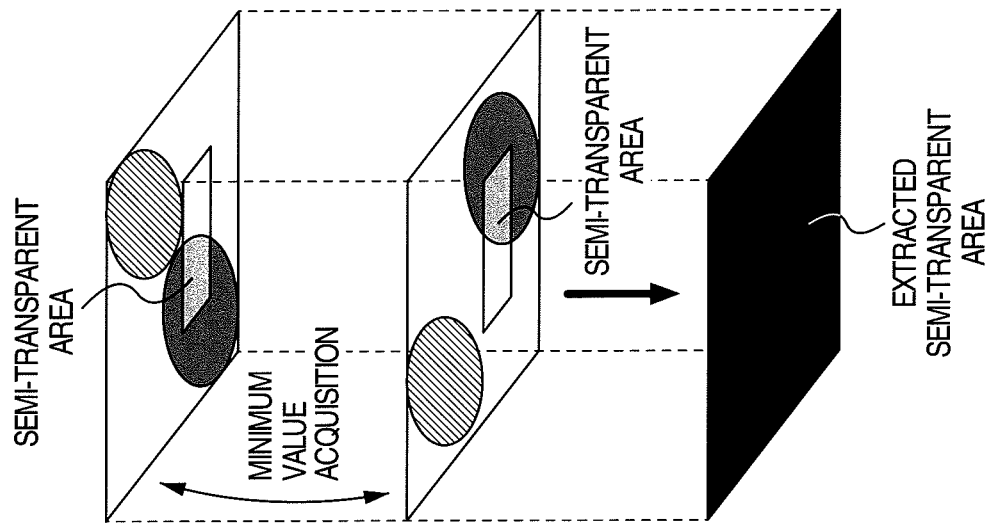
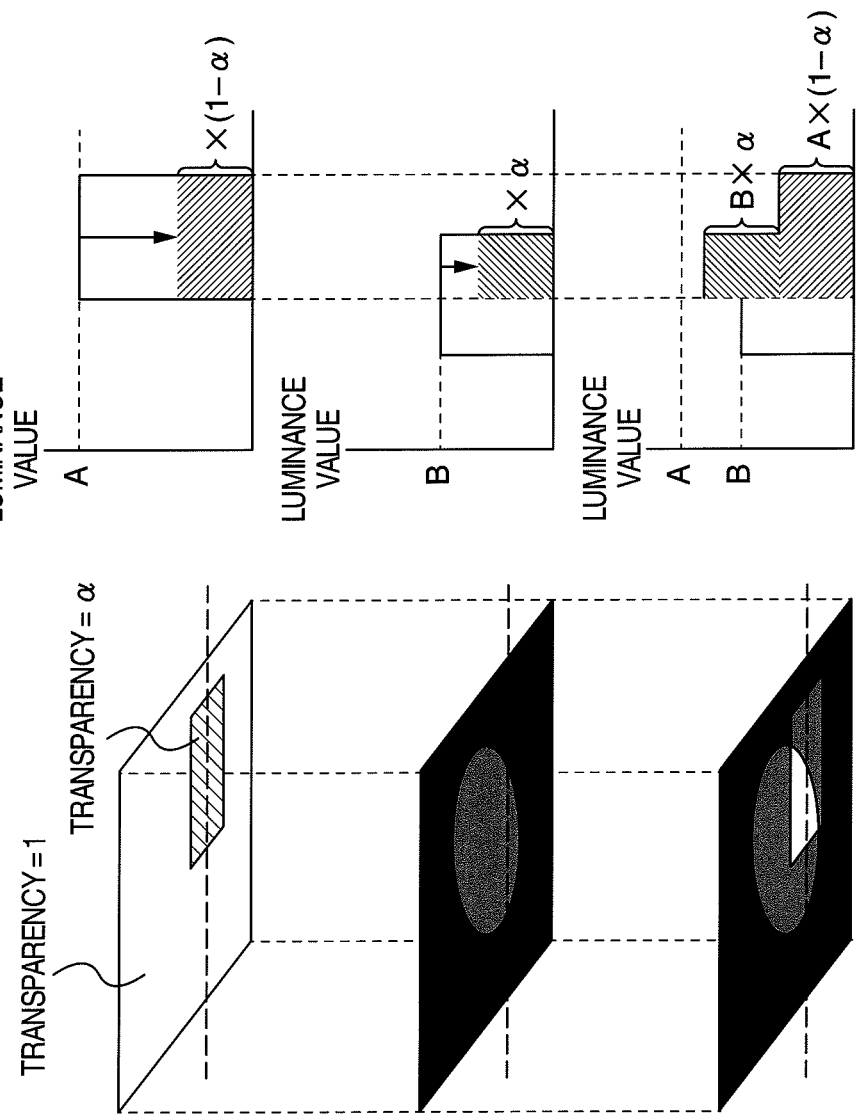
FIG. 6A
FIG. 6B

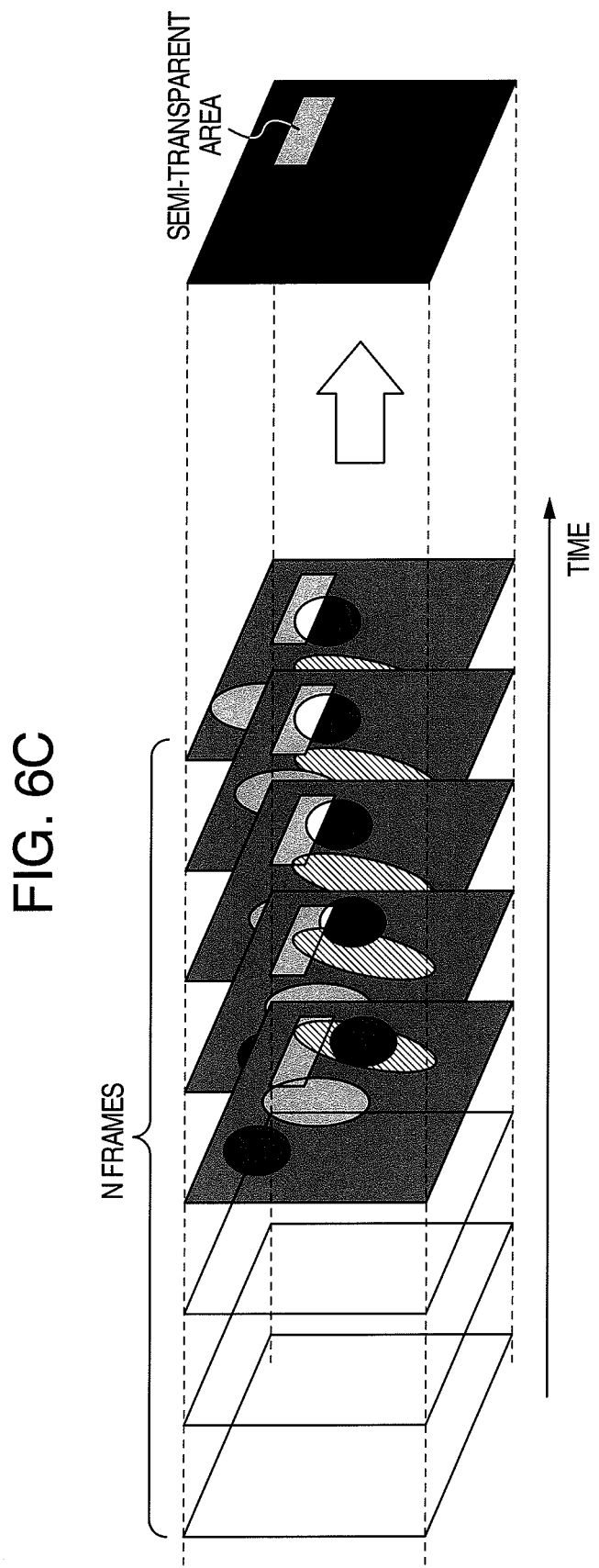

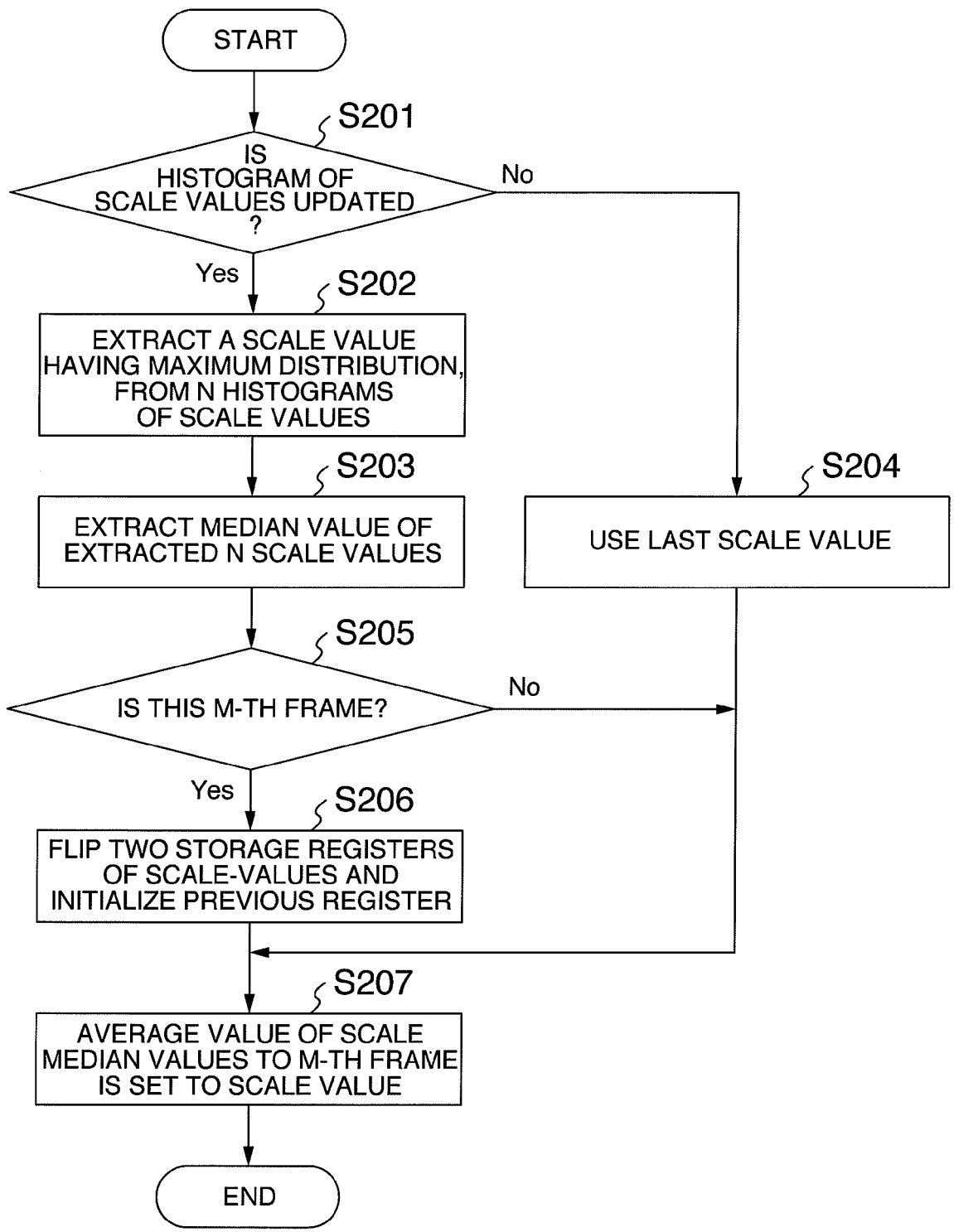

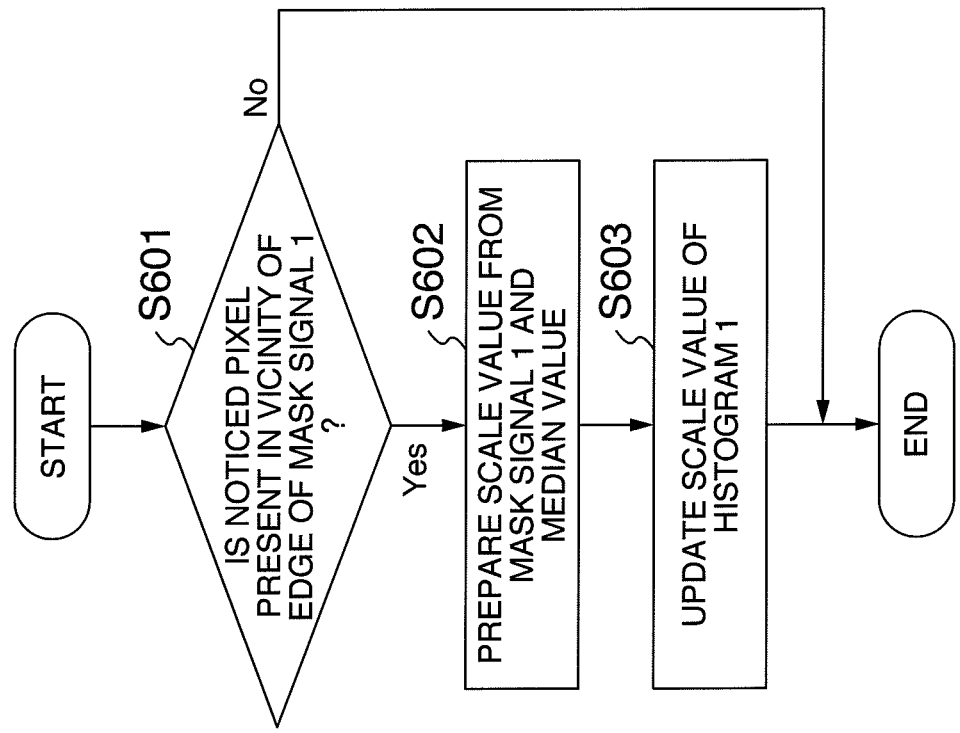
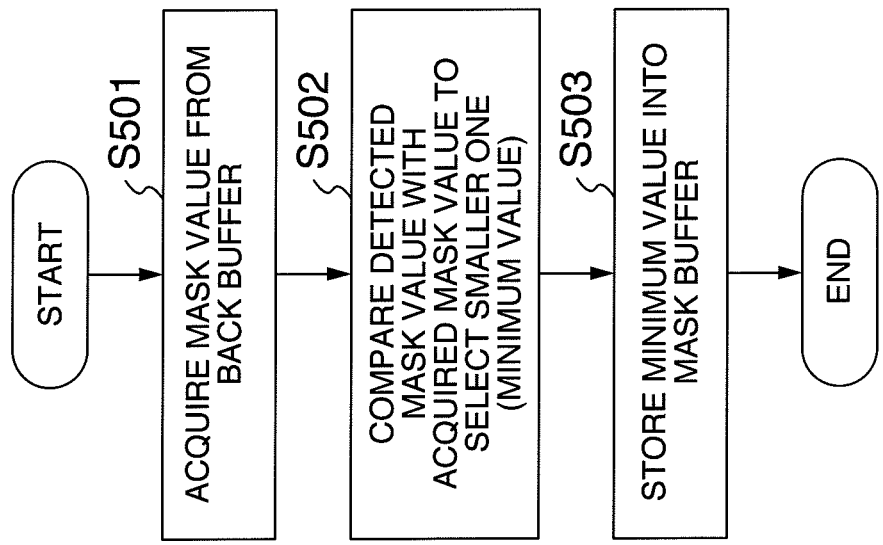

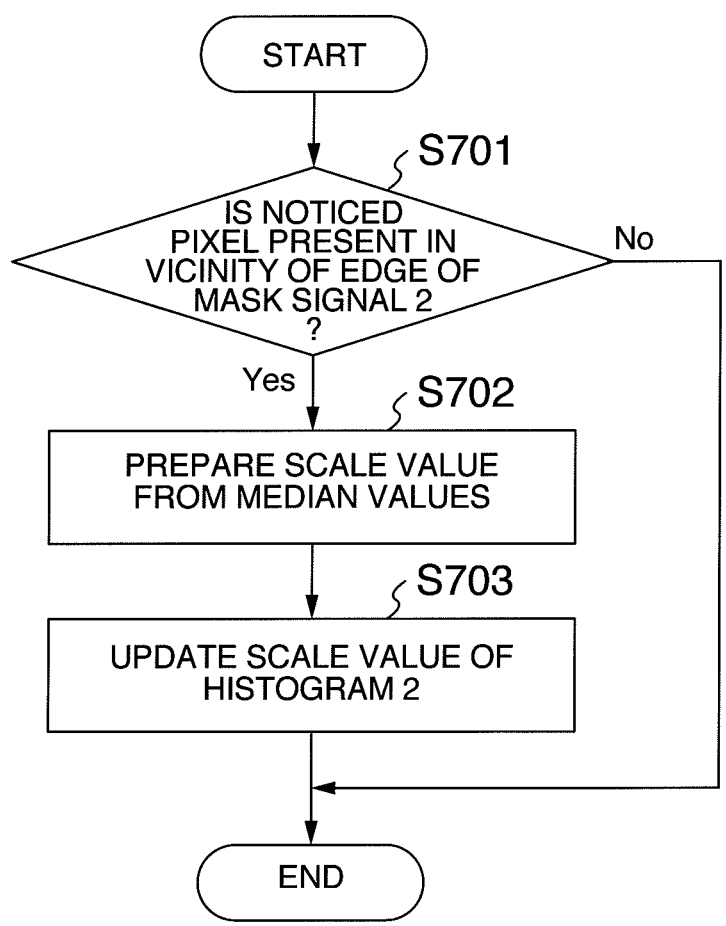

IMAGE PROCESSING APPARATUS AND IMAGE PROCESSING METHOD

INCORPORATION BY REFERENCE

The present application claims priority from Japanese application JP2007-080482 filed on Mar. 27, 2007, the content of which is hereby incorporated by reference into this application.

BACKGROUND OF THE INVENTION

The present invention relates to image processing apparatuses and methods for converting, for example, the frame rate of an inputted image signal by frame interpolation, and in particular, relates to a technique for excellently performing frame interpolation to an image containing an image portion having transparency.

The smoothing of the movement of an image by the so-called frame interpolation where an interpolation frame is inserted between a sequence of frames of an input image signal is currently widely performed. Such image processing is called, for example, frame rate conversion, where the number of frames (frame frequency) of an inputted image signal is converted by inserting the above-described interpolation frame between a sequence of frames of the input image signal.

In such frame rate conversion, an interpolation frame is generated by detecting a motion vector indicative of a movement of an object within an image from two consecutive frames within the inputted image signal and then calculating an average or median value between values (data) of a pixel or block of the two frames indicated by the motion vector. Generally, this motion vector is detected using a block matching method, for example.

This motion vector is also used in encoding an image, and the encoding of an image is performed individually after separating the background image and an object in the image. At this time, when an object has transparency, a transparent image and the background image may be identified and separated from each other using a plane data indicative of the transparency thereof, so that each may be encoded individually. Such prior art is known in JP-A-2000-324501, for example.

SUMMARY OF THE INVENTION

Incidentally, for example, in a television broadcasting signal, an image portion, e.g., a semi-transparent character telop such as a logo indicative of a broadcasting station name or the like, having transparency may be superimposed on a normal video picture. This transparent image portion is a semi-transparent image portion in which information of a normal video picture (background image) and information constituting a character are intermingled. For this reason, when calculating a motion vector with respect to such an image using the above-described block matching method, the relevant transparent image portion and background image may be matched, so that a motion vector may be faultily detected.

Furthermore, in the television broadcasting signal, with respect to the transparent image portion the α plane data is not transmitted or not often transmitted. Accordingly, in the prior art, with respect to an image to which the α plane data is not added, it is difficult to separate a background image and a transparent image and thus the above-described likelihood of false detection of a motion vector cannot be satisfactorily reduced.

The present invention has been made in view of the above-described problems. It is an object of the present invention to provide a technique capable of performing high-precision frame interpolation even to an image on which a transparent image portion is superimposed and capable of obtaining a high-quality image.

In order to achieve the above-described object, the present invention is characterized by configurations as set forth in the appended claims. Specifically, the present invention is characterized in that a pixel data common among a plurality of frames within an inputted image signal is detected from an inputted image signal and thereby the inputted image signal is separated into a transparent image portion having transparency and a background image, and then frame interpolation is performed to this separated background image, and then the frame-interpolated background image is combined with the above-described separated transparent image portion.

Then, according to such a configuration, a transparent image portion can be separated from a background image even without a plane data indicative of transparency and therefore the frame interpolation processing can be performed to the background image. Accordingly, in the present invention, since the frame interpolation process using a motion vector is not performed to a transparent image portion, such as a semi-transparent character telop, the likelihood of false detection of a motion vector in the relevant transparent image portion is reduced.

According to the present invention, even for an image on which a transparent image portion is superimposed, it is possible to improve the detection accuracy of a motion vector and obtain a high-quality frame interpolation image.

Other objects, features and advantages of the invention will become apparent from the following description of the embodiments of the invention taken in conjunction with the accompanying drawings.

BRIEF DESCRIPTION OF THE DRAWINGS

FIGS. 5A to 5F are views explaining a method for reconstructing a semi-transparent static image concerning this embodiment.

FIGS. 6A to 6D are views explaining methods for generating a mask signal and a mask buffer concerning this embodiment.

FIG. 8 is a flowchart showing the detailed process of S200 of FIG. 7A.

FIG. 11 is a flowchart showing the detailed process of S500 of FIG. 7B.

FIG. 12 is a flowchart showing the detailed process of S600 of FIG. 7B.

FIG. 13 is a flowchart showing the detailed process of S700 of FIG. 7B.

DESCRIPTION OF THE EMBODIMENTS

Figure 1:
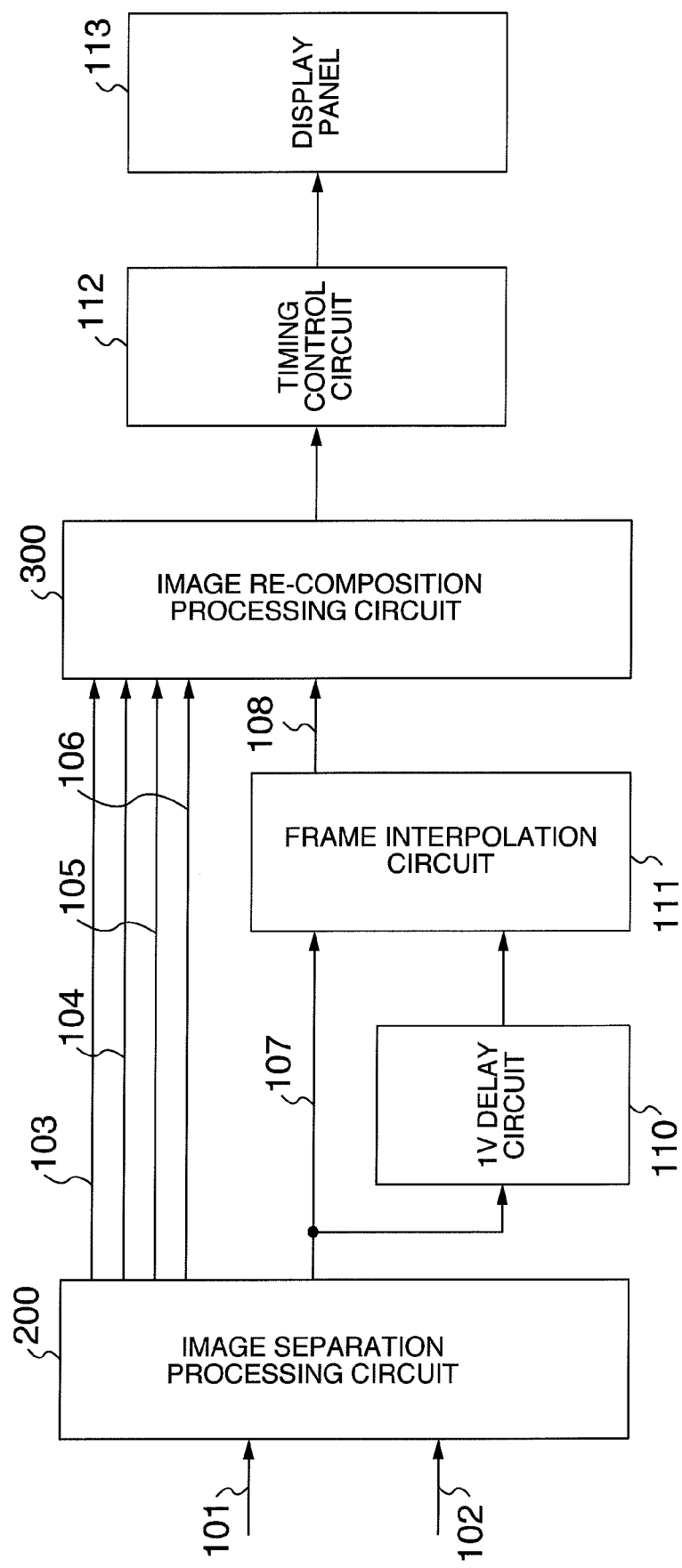
FIG. 1 shows an example of an image processing apparatus concerning the present invention.

Hereinafter, an embodiment of the present invention will be described with reference to the accompanying drawings. First, an example of an image processing apparatus to which the present invention is applied is described using FIG. 1. FIG. 1 shows a configuration example of an image display apparatus, such as a television receiver, provided with a display part, e.g., an LCD panel, PDP, or the like, as an image processing apparatus.

In FIG. 1, such image processing apparatus is provided with an image signal 101 and a synchronizing signal 102 including a vertical synchronizing signal (VSYNC signal). An image separation processing circuit 200 operates so as to separate a transparent image portion having transparency and a background image from the inputted image signal 101. A background image signal 107 separated by the image separation processing circuit 200 is inputted to a frame interpolation circuit 105 and a 1V delay circuit 104 comprising a frame memory for delaying the background image signal 107 by one frame period (one vertical interval). The frame interpolation circuit 105 performs frame interpolation process using the background image signal 107 and a background image signal that is delayed by one frame and outputted from the 1V delay circuit 104.

In this frame processing, a process of detecting a motion vector from these two frames using the block matching method, for example, and a process of generating an interpolation frame using this detected motion vector are performed. In the process of detecting a motion vector, if for example, between the above-described two frames, an interpolation frame newly prepared is inserted, then a plurality of straight lines that pass through a certain pixel (interpolation pixel) within this interpolation frame and pass through a predetermined search area (block) of the respective two frames are set. Then, among these straight lines, a straight line having the minimum difference between blocks of each frame (namely, a straight line having high correlation) is searched. As a result, a straight line having the minimum difference is detected as a motion vector of the relevant interpolation pixel.

The value of an interpolation pixel is calculated using an average or median value of the values of blocks (or pixels) on two frames indicated by the motion vector passing through this interpolation pixel. By performing this process to all the interpolation pixels constituting an interpolation frame, the interpolation frame is prepared. Then, this interpolation frame is inserted or replaced between a sequence of frames of an input image signal to thereby convert the frame rate (frame frequency) of the inputted image signal. A background image signal 108 that is frame-interpolated this way is supplied to an image re-composition processing circuit 300. The present embodiment can be also applied to the case where an inputted image signal with a 60 Hz frame rate is converted to the image signal with 120 Hz, which is twice 60 Hz, by inserting an interpolation frame every other frame. Moreover, the present embodiment can be also applied to the case where among inputted image signals having a frame rate of 60 Hz that are obtained by 2:3 pulling down a video picture having the number of frames of 24, a signal having the frame rate of 60 Hz, whose movement is smoothed by replacing a plurality of frames with an interpolation frame, is generated.

In addition, since the processes of the above-described detection of a motion vector and generation of an interpolation frame do not directly relate to the scope of the present invention, further detailed description thereof is omitted. For these details, see JP-A-2006-165602 corresponding to U.S. Patent Application Publication No. 2008/0007614, for example.

On the other hand, in addition to the background image signal 107, the image separation processing circuit 200 also outputs a scale signal-1 103, a mask signal-1 104 indicative of the area of a transparent image portion, a mask signal-2 105 similarly indicative of the area of the transparent image portion, and a scale signal-2 106, and supplies these signals to the image decomposition processing circuit 300. Here, the scale signal-1 and the scale signal-2 are used to scale (amplify), among background image signals obtained by separating a transparent image portion, a signal in an area on which the transparent image portion is superimposed, thereby obtaining a signal approximating the original background image of the relevant area. Namely, the scale signal is equal to a signal indicative of the transparency of the transparent image portion. In this embodiment, two sets of scale signals and mask signals are outputted. This is because, as described later, the scale signal and the mask signal are obtained from two data, i.e., from the original pixel value (data) of the transparent image portion and a pixel value obtained by inverting this pixel value. Of course, the scale signal and the mask signal may be either one of the two.

The image re-composition circuit 300 performs, for example, a process of re-combining a frame-interpolated background image signal with a transparent image portion using the frame-interpolated background image signal 108, the scale signal-1 103, the mask signal-1 104, the mask signal-2 105, and the scale signal-2 106. In this way, it is possible to obtain an image whose frame rate is converted while eliminating the influence of the motion vector detection on the transparent image portion.

The composition image signal outputted from the image re-composition circuit 300 is supplied via a timing control circuit 112 to a display panel 113 comprising an LCD panel, a PDP, or the like. In response to the timing of the frame rate-converted image signal from the image re-composition circuit 300, the timing control circuit 112 controls the horizontal and vertical timings of the display panel 113 so as to form the relevant image signal on the display panel 113. In this way, the frame rate-converted image signal is displayed on the display panel 113.

Figure 2:
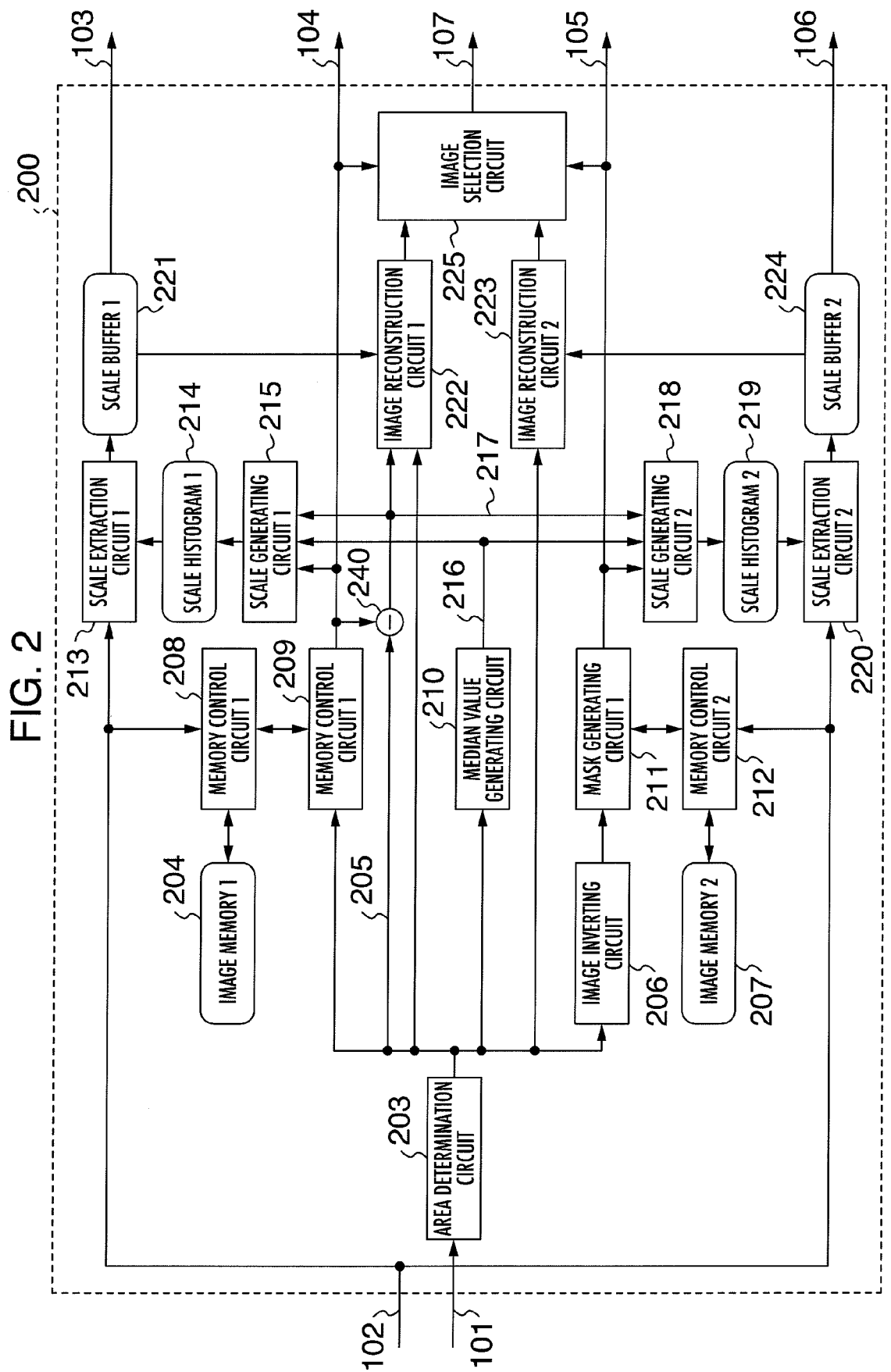
FIG. 2 is a view showing a specific example of an image separation processing circuit 200.

Next, the detail of the image separation processing circuit 200 which is the feature of this embodiment is described with reference to FIG. 2. Before describing the detail of the configuration of FIG. 2, the concept of separation between a background image and a transparent image portion is described using FIG. 4 to FIG. 6.

In this embodiment, a semi-transparent composition image (e.g., a character telop in which a background image and a character part are intermingled), which is the transparent image portion to be separated from an inputted image signal, is generally prepared as shown in FIG. 6A. As shown on the right side of FIG. 6A, the luminance value (luminance value of a portion hatched with slanting lines) in a cross section along a dashed line of a semi-transparent image A is expressed with $A \times (1-\alpha)$, where the transparency of the semi-transparent image A is $\alpha$ ($1 \geq \alpha \geq 0$). On the other hand, the luminance value of a background image B in the cross section of the dashed line is expressed with $\alpha \times B$. Accordingly, the luminance of a composition image of the semi-transparent image A and the background image B in the cross section along the dashed line is expressed with $A \times (1-\alpha) + \alpha \times B$ as shown in the bottom view on the right side of FIG. 6A. Here, when an image signal is the three primary color signals of RGB, a composition image (R, G, B) of the semi-transparent image A ($R_s$, $G_s$, $B_s$) having a constant transparency α and the background B ($R_d$, $G_d$, $B_d$) can be expressed by Equation 1 below.

$$R = R_d \times \alpha + R_0$$
$$G = G_d \times \alpha + G_0$$
$$B = B_d \times \alpha + B_0 \quad (1)$$

Here, for example, the semi-transparent image, such as a logo indicative of a broadcasting station name, is stationary, so that the static image ($R_0$, $G_0$, $B_0$) will have a fixed value over several frames, thereby satisfying a relation of Equation 2 below.

$$R_0 = R_s \times (1-\alpha)$$
$$G_0 = G_s \times (1-\alpha)$$
$$B_0 = B_s \times (1-\alpha) \quad (2)$$

From the above, as the condition that the background image can be separated, $\alpha \neq 0$ must be satisfied. Moreover, when α=0, the static image is an opaque composition image and therefore the background image may be handled as a zero value. Then, consider the case where $\alpha \neq 0$ is satisfied. At this time, the background image is expressed by Equation 3.

$$R_d = R_{df}/\alpha$$
$$G_d = G_{df}/\alpha$$
$$B_d = B_{df}/\alpha \quad (3)$$

Where, $R_{df}$, $G_{df}$, and $B_{df}$ are expressed by Equation 4 below, respectively.

$$R_{df} = R - R_0$$
$$G_{df} = G - G_0$$
$$B_{df} = B - B_0 \quad (4)$$

Here, in particular, when the luminance of each pixel of the semi-transparent static image is low, the above Equation 3 is approximated by Equation 5 below.

$$R_d \cong R/\alpha$$
$$G_d \cong G/\alpha$$
$$B_d \cong B/\alpha \quad (5)$$

However, $R_s$, $G_s$, and $B_s$ satisfy the condition of Equation 6 below, where a predetermined threshold is denoted by δ.

$$R_s < \delta,\ G_s < \delta,\ B_s < \delta \quad (6)$$

In the foregoing, the pixel value has been described as the RGB value. However, when a component signal (YCbCr value) comprising a luminance signal and a color-difference signal is used, only Y value (luminance component) may be used and thus the calculation of the background image and semi-transparent image can be simplified.

Next, consider images of two frames having quite different background images as shown in FIG. 6B. In these two images, if pixel values at the same coordinate (pixel position) of the respective frames are compared to calculate a smaller value (hereinafter, referred to as minimum value acquisition) or to calculate the logical AND thereof as a approximation method, then as the component common to each frame, a fixed value can be extracted as shown at the bottom of FIG. 6B. Namely, since a transparent image, such as a character telop, is a static image and its pixel value will not vary greatly (typically, semi-transparent white), a pixel corresponding to this transparent image has a fixed value common in a plurality of frames. Then, as described above, if the minimum value acquisition or the logical AND operation is performed repeatedly among a plurality of frames, e.g., among 20 to 30 frames, it is possible to detect fixed values distributed in an area substantially equal to that of the displayed transparent image. In this way, the transparent image can be extracted.

In the actual moving image, since the above-described difference is not such large, the minimum value acquisition or the logical AND operation is repeatedly performed to a plurality of temporally consecutive frames (N frames) as shown in FIG. 6C to thereby calculate the fixed value while setting to 0 the difference in pixel values between two frames that is not greater than a threshold. Although the value of N used in this embodiment is in the range from 20 to 30, for example, the value may be less than this.

Here, once the α value is determined, if a signal of a portion, on which a transparent image portion (character telop portion) is superimposed, of the background image is scaled, in other words if a signal of the relevant portion is amplified, in accordance with Equation 3 and Equation 4, then the original background image can be reconstructed. This situation is described using FIGS. 5A to 5F.

Figure 5F:
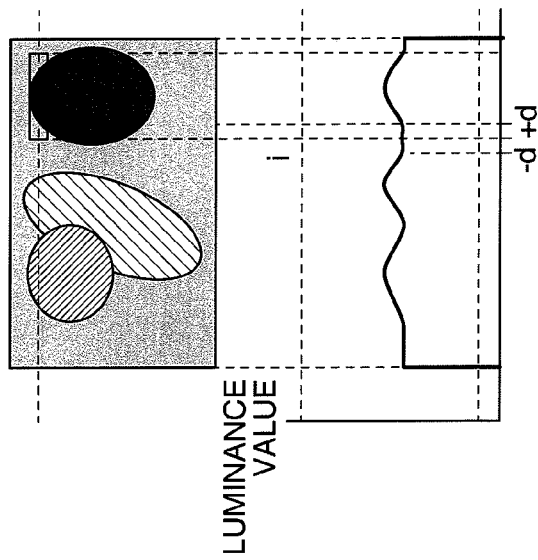

FIG. 5A shows an inputted image signal, where a character telop which is a transparent image portion is superimposed on a background image. In FIGS. 5A to 5F, the boundary between the transparent image portion and the background image is indicated by i, and the position of the inner side of this boundary i (inside the transparent image portion) is denoted by +d and the outer side thereof by −d. In the transparent image portion, the luminance value which the data of its own has and the luminance value of the background image are combined. For this reason, the luminance value of the transparent image portion (in the cross section of the dotted line of FIGS. 5A-5F), i.e., the luminance value at the position of +d, is high from the boundary i as compared with the luminance value of the background image, i.e., the luminance value at the position of −d, as illustrated. In FIG. 5A, a portion hatched with slanting lines represents the luminance value of the transparent image portion itself. The transparent image portion is extracted from this composition image using the approach as described above. The luminance of this extracted transparent image portion is shown in FIG. 5B. As apparent from FIG. 5B, the luminance value of the transparent image portion is equal to the hatched portion of FIG. 5A. Then, the background image obtained by separating the transparent image portion of FIG. 5B from the original image shown in FIG. 5A is the one shown in FIG. 5C. Since the transparent image portion contains the data of the background image, the level of a signal of the portion on which a transparent image portion of the background image is superimposed drops as compared with that of the original image. For this reason, by increasing the level of the signal of the relevant portion using a scale value (transparency) obtained from the above Equation 3 and Equation 4, the luminance of the portion on which the transparent image portion is superimposed is made almost equal to that of the original image.

In this way, the background image can be reconstructed and the frame interpolation can be performed while maintaining the condition of the original image. Furthermore, the recombination is also possible using the above Equation 1.

Now, assume that the adjacent pixels have almost the same pixel value. For simplicity of description, if either value of R value, G value, B value, or Y value is denoted by X and the pixel component at a coordinate (i, j) is denoted by a fixed value X (i, j), then the relation between the adjacent pixels can be expressed with Equation 7 below.

$$X(i,j)=X(i-1,j)+\Delta X(i-1,j) \quad (7)$$

Then, if n pixels in the periphery of di about the coordinate (i, j) are regarded as being in the adjacent area and the approximation of Equation 8 below is performed to Equation 7, then the Equation 7 can be replaced with Equation 9 below.

$$0 \cong \Sigma_{|k|<di} \Delta X(i-k,j) \quad (8)$$

$$X(i,j) \cong \Sigma_{|k|<di} X(i-k,j)/n \quad (9)$$

Incidentally, if a fixed value $X_0$ is present in a closed interval $[i_0, i_1]$, then Equation 9 can be further expressed as Equation 10 below.

$$X_0(i,j) \cong X_0 F_{i0,i1}(i) \quad (10)$$

Here, assume that $F_{i0,i1}(i)$ is defined by Equations 11 below.

$$F_{i0,i1}(i)=H(i-i_0)H(i_1-i) \quad (11)$$

In Equation 11, H is the Heaviside function, where $H(x)=1$ when $X \geq 0$, and otherwise $H(x)=0$. In particular, since $\Sigma_{|k|<i0+di} F_{i0,i1}(k)>0$ at the contour $(i_0, j)$ of the semi-transparent area, the above Equation 9 can be rewritten as Equation 12 below.

$$X_d(i_0,j) \cong \Sigma_{|k|<i0+di} X(k,j) F_{i0,i1}(k)/\Sigma_{|k|<i0+di} F_{i0,i1}(k) \quad (12)$$

If this is applied to Equation 3, then Equation 12 becomes Equation 13 and the α value can be calculated.

$$\alpha_{i0} \cong X_d(i_0,j)/X_d(i_0,j) \quad (13)$$

Moreover, the α value is the same value over several frames, so if the number of contour pixels in one frame is denoted by N and the number of frames is denoted by F, the α value can be calculated from Equation 14 below.

$$\alpha = \Sigma_N \Sigma_F \alpha_{N,F}/(N \times F) \quad (14)$$

In the above Equation 9, Equation 12, and Equation 14, the α value is calculated using the average of peripheral pixel values about the boundary i, however, the α value may be calculated using a median value of the relevant peripheral pixel values. Specifically, the median value is useful when the gray scale difference in the pixel values around the boundary i decreases due to the scale processing described above or the anti-alias processing, while the average value is useful when the background contains a lot of high frequency components. Furthermore, instead of calculating the α value by averaging over a plurality of numbers of pixels in the periphery of the boundary i within one frame, the α value may be calculated using a histogram obtained by summing the number of pixels corresponding to each gray scale of the α value. For example, in this histogram, a center gray scale when a total number of pixels of the adjacent gray scales (e.g., ±2 gray scales) becomes the maximum may be calculated as the α value. Moreover, a combination of the above-described method of calculating by an average and method of calculating by a histogram can improve the accuracy of the α value.

Here, if the semi-transparent image is a low luminance image having luminance less than the predetermined threshold δ as in the above Equation 6, the fixed value coefficient $X_0$ in Equation 10 is cut off by the determination of the threshold at the time of the minimum value acquisition and therefore $X_0(i,j)=0$ is always valid. On the other hand, the distribution function $F_{i0,i1}$ of the above Equation 11 is a mask signal indicative of the area of a semi-transparent image (transparent image portion), and identifies an area (i.e., transparent image portion) where fixed values are distributed, by determining whether or not the fixed value obtained using the method of FIG. 6C is 0. Accordingly, when the semi-transparent image is a low luminance image having luminance less than the predetermined threshold δ, the α value cannot be calculated.

Figure 5E:
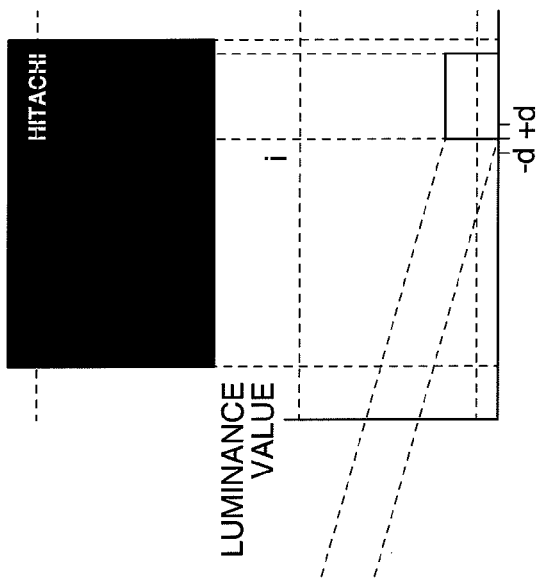
Figure 5D:
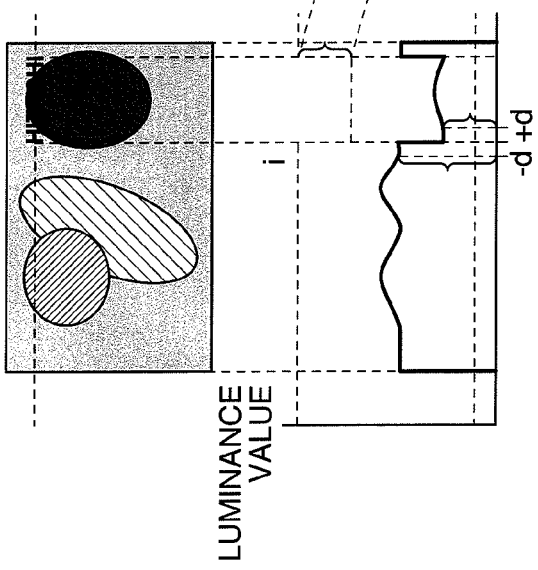

Then, in this embodiment, when $X<X_T$, where $X_T$ is a threshold at the time of minimum value acquisition, the distribution function $F_{i0,i1}$ is calculated by inverting the pixel as shown in FIG. 5D and FIG. 5E. Then, by adding a transparent image portion of FIG. 5E to the original image shown in FIG. 5D, it is possible to obtain a background image in which the transparent image portion is separated from the original image, as shown in FIG. 5F. At this time, since the maximum luminance $X_{max}$ is also scaled to $\alpha X_{max}$ by the α value, the resultant background image has a fixed value equal to or greater than $(1-\alpha)X_{max}$.

Now, let the inverted pixel be denoted by X' and assume the fixed value $X'_0$ is present in a closed interval $[i'_0, i'_1]$, then $X'_0$ and $F'_{i'0,i'1}$ are expressed by Equation 15 and Equation 16 below, respectively.

$$X'_0(i,j) \cong X'_0 F'_{i'0,i'1}(i) \quad (15)$$

$$F'_{i'0,i'1}(i)=H(i-i'_0)H(i'_1-i) \quad (16)$$

Similarly, since $\Sigma_{|k|<i'0+di} F'_{i'0,i'1}(k)>0$ at the contour $(i'_0, j)$ of the semi-transparent area, Equation 15 can be rewritten as Equation 17 below.

$$X_d(i'_0,j) \cong \Sigma_{|k|<i'0+di} X(k,j) F'_{i'0,i'1}(k)/\Sigma_{|k|<i'0+di} F'_{i'0,i'1}(k) \quad (17)$$

Applying this to Equation 5 results in Equation 18, and the α value is obtained.

$$\alpha_{i'0} \cong X(i_0,j)/X_d(i_0,j) \quad (18)$$

Moreover, as in the case of $X \geq X_T$, the α value may be substituted into Equation 14 and used.

With the above method, in this embodiment, for the respective cases of $X \geq X_T$ and $X<X_T$, the background image and the semi-transparent static image are separated from each other, and after preparing an interpolation image using the frame interpolation method, the semi-transparent static image is reconstructed using the respective corresponding α values. Namely, in this embodiment, when $X \geq X_T$, i.e., when the semi-transparent image has a certain or higher luminance, the fixed value is calculated from the pixel value of the relevant semi-transparent image, while when $X<X_T$, i.e., when the semi-transparent image has a low luminance, the fixed value is calculated from a pixel value obtained by inverting a pixel value of the relevant semi-transparent image. This makes it possible to precisely calculate the fixed value for identifying the relevant semi-transparent image even when the semi-transparent image has a low luminance.

Figure 4A:
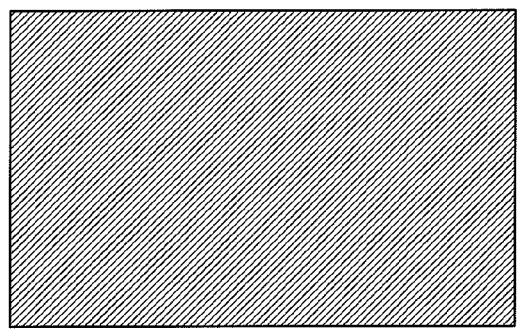
FIGS. 4A to 4D are views showing examples of areas where image separation and composition processings are performed, concerning this embodiment.
Figure 4B:
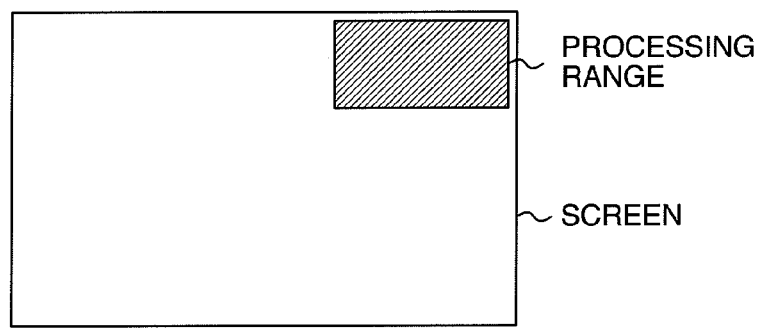

The calculation of the fixed values as described above may be performed over entire one frame as shown in FIG. 4A. Moreover, as shown in FIG. 4B, by specifying a processing range and adding a process of determining whether or not the coordinate (i, j) belongs to the specified processing range, the fixed value only in the relevant processing range may be calculated. The above-described logo or the like indicative of a broadcasting station name is often displayed on the right end side of a screen, so that if an area for calculating the fixed value is specified as shown in FIG. 4B in advance, the computational effort involved in the fixed value calculation can be reduced and the software and hardware resources can be reduced.

Figure 4C:
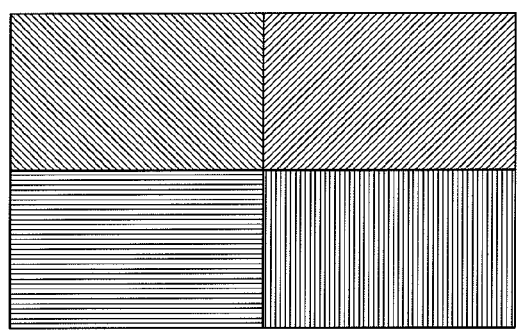
Figure 4D:
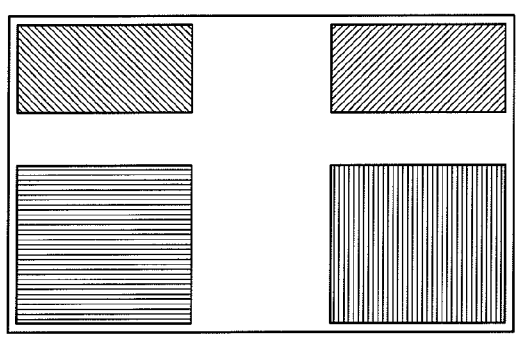

Moreover, by preparing a plurality of processes involved in this embodiment and causing these processes to be performed independently, respectively, it is possible to set the thresholds, e.g., δ, $X_T$, and the like, for a plurality of areas, as shown in FIG. 4C and FIG. 4D, so that each area can be processed independently.

Figure 6D:
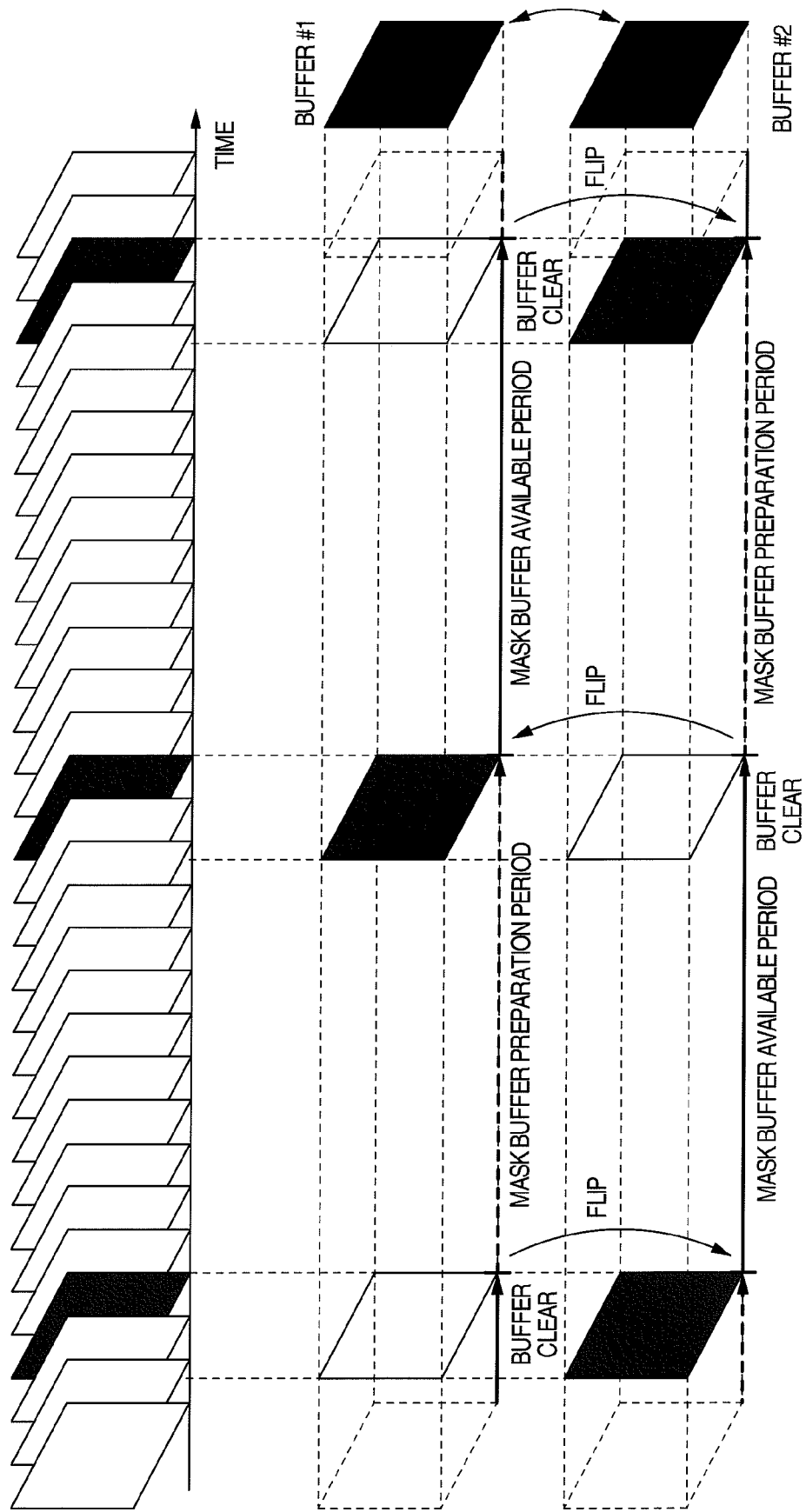

Furthermore, the requirements when a semi-transparent static image has been updated or when moving pictures are switched can be addressed, for example, as shown in FIG. 6D, by preparing a plurality of mask buffers for storing fixed values in advance and switching these mask buffers at a predetermined frame number M. Similarly, the requirements when a method of taking an average value among a plurality of frames as in Equation 14 is used can be also addressed by preparing a plurality of registers for storing α values in advance and switching these registers in synchronization with the above-described timing.

Next, an example of a specific circuit for performing the above-described image processing concerning this embodiment is described with reference to FIG. 2. FIG. 2 shows a specific example of the image separation processing circuit 200 shown in FIG. 1, wherein the upper half and lower half portions perform functions symmetric to each other. Namely, the upper half portion of the image separation processing circuit shown in FIG. 2 is a high luminance side circuit for performing a processing to a high luminance transparent image portion ($X \geq X_T$), while the lower half portion is a low luminance side circuit for performing a processing to a low luminance transparent image portion ($X < X_T$).

An area determination circuit 203 is provided with the image signal 101 and determines from this signal whether or not this signal belongs to a pre-specified processing area (e.g., the area shown in FIG. 4B), and outputs an image signal 205 belonging to this processing area. Here, assume that the specified processing area is larger than an area on which the transparent image portion is superimposed. This area determination circuit 203 may not be provided if the processing is performed to the entire area of the frame as shown in FIG. 4A. A signal from the area determination circuit 203 is supplied to a mask generating circuit-1 209 that is an element of the high luminance side circuit and to an image inverting circuit 206 that is an element of the low luminance side circuit. In addition, a signal that is determined not to belong to the processing area by the area determination circuit 203 is outputted as it is (supplied to the 1V delay circuit 110) without going through processings by the subsequent circuits.

First, the configuration and operation of the high luminance side circuit is described. The mask generating circuit-1 209 detects the above-described fixed value for each pixel in accordance with Equation 10 to generate the mask signal-1 104. Namely, the mask signal-1 is formed from the fixed value, and is also used as a signal for identifying or designating the transparent image portion. This mask signal-1 is supplied to an image memory-1 204 as the mask buffer and is stored therein. A memory control circuit-1 208 is provided with the vertical synchronizing signal 102 associated with the image signal 101 and performs, based on this vertical synchronizing signal 102, an access control to the image memory-1 204 and a double buffer control or single buffer control. Moreover, the mask signal-1 104 from the mask generating circuit-1 209 is subtracted from the image signal 205 from the area determination circuit 203 by a subtractor 240. In this way, a difference signal 217 containing a background image obtained by excluding the transparent image portion from the inputted image signal is separated and outputted.

A median value generating circuit 210 is provided with the image signal 205 from the area determination circuit 203, and calculates an average value or a median value from a plurality of pixel values obtained by delaying by a specified number of clocks, in accordance with the above Equation 12 or Equation 17 or by using a method equivalent thereto. In this example, although a median value is calculated, an average value may be calculated.

A scale generating circuit-1 215 is provided with a median value 216 from the median value generating circuit 210, the mask signal-1 104 from the mask generating circuit-1 209, and the difference signal 217 from the subtractor 240, and generates, based on these signals, a scale value (α value) in accordance with the above Equation 13. The scale value (α value) obtained in this scale generating circuit-1 215 is supplied to a scale histogram generator-1 214, where for each scale value (α value) in a predetermined level range, the number of occurrences of a pixel belonging to the relevant level range is counted to generate a histogram. A scale extracting circuit-1 213 discriminates and extracts a scale value (α value) having the highest number of occurrences of a pixel in the histogram generated by the scale histogram generator-1 214. Then, in response to the inputted vertical synchronizing signal 102, the scale extracting circuit-1 213 outputs the extracted scale value (α value) to a scale buffer-1 221 comprising registers, once in a frame. The scale buffer-1 221 stores this scale value (α value) therein and outputs this as the scale signal-1 103.

An image reconstruction circuit-1 222 is provided with the image signal 205 from the area determination circuit 203, the difference signal 217 from the subtractor 240, and the scale signal-1 103 from the scale buffer-1 221, and reconstructs, based on these signals, the background image in accordance with the above Equation 3 and Equation 4 (for example, using the method shown in FIGS. 5A to 5C).

These are the configuration and operation of the high luminance side circuit. Next, the configuration and operation of the low luminance side circuit are described.

In the low luminance side circuit, for the image signal 205 from the area determination circuit 203, the pixel value thereof is inverted by an image inverting circuit 206. The image signal inverted by this image inverting circuit 206 is supplied to a mask generating circuit-2 211. The mask generating circuit-2 211 detects the above-described fixed value for each pixel in accordance with the abobe Equation 15 to generate the mask signal-2 105. Namely, the mask signal-2 105 is formed from the fixed value detected from the inverted image, and is used as a signal for identifying or designating the transparent image portion. This mask signal-2 105 is supplied to an image memory-2 207 as the mask buffer and is stored therein. A memory control circuit-2 212 is provided with the vertical synchronizing signal 102 and performs, based on this vertical synchronizing signal 102, an access control to the image memory-2 212 and a double buffer control or single buffer control.

A scale generating circuit-2 218 is provided with the median value 216 from the median value generating circuit 210, the mask signal-2 105 from the mask generating circuit-2 211, and the difference signal 217 from the subtractor 240, and generates, based on these signals, the scale value (α value) in accordance with the above Equation 18. The scale value (α value) obtained in this scale generating circuit-2 218 is supplied to a scale histogram generator-2 219, where a histogram of scale values (α values) is generated using the same method as in the scale histogram generator-1 215 on the high luminance side described above. A scale extracting circuit-2 220 extracts a scale value (α value) from the histogram, as in the scale extracting circuit-1 213 on the high luminance side. Then, in response to the inputted vertical synchronizing signal 102, the scale extracting circuit-2 220 outputs the extracted scale value to a scale buffer-2 224 comprising registers, once in a frame. The scale buffer-2 224 stores this scale value (α value) therein and outputs this as the scale signal-2 106.

Moreover, the image reconstruction circuit-1 222 is provided with the image signal 205 from the area determination circuit 203, the difference signal 217 from the subtractor 240, and the scale signal-1 from the scale buffer-1 221, and reconstructs, based on these signals, the background image in accordance with the above Equation 3 and Equation 4 (for example, using the method shown in FIGS. 5A to 5C).

An image reconstruction circuit-2 223 is provided with the image signal 205 from the area determination circuit 203, and the scale signal-2 106 from the scale buffer-2 224, and reconstructs, based on these signals, the background image in accordance with the above Equation 5 (for example, using the method shown in FIGS. 5D to 5F).

These are the configuration and operation of the low luminance side circuit.

The background images reconstructed in the respective image reconstruction circuit-1 222 and image reconstruction circuit-2 223 are supplied to an image selection circuitry 225, respectively. The image selection circuit 225 performs a selection process so as to give priority to the input signal which is not 0, i.e., the signal on the high luminance side among the inputted reconstructed background image signals on the high luminance side and on the low luminance side. At this time, if the luminance of the transparent image portion is very low, the reconstructed background image signal on the low luminance side is selected. The reconstructed background image signal 107 outputted from the image selection circuit 225 is subjected to the frame interpolation by the 1V delay circuit 110 and the frame interpolation circuit 111 of FIG. 1 as described above. In this way, the frame interpolation is performed only to the background image portion, and the influence on the frame interpolation by the transparent image portion, i.e., the above-described likelihood of false detection of a motion vector, can be reduced.

Figure 3:
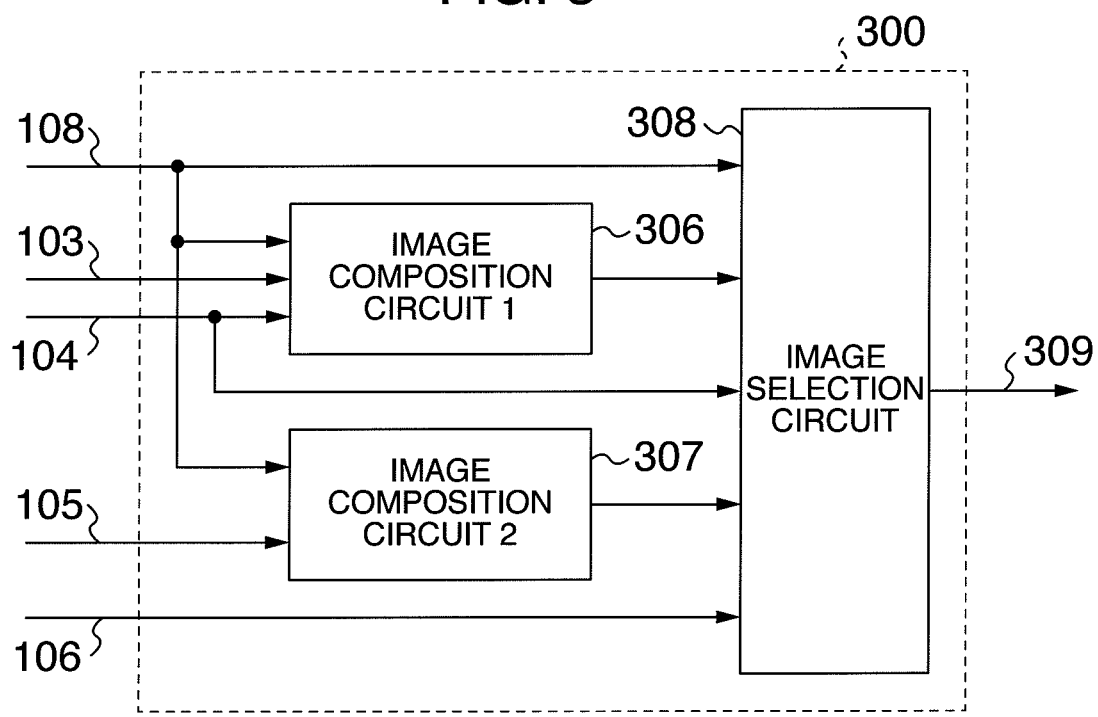
FIG. 3 is a view showing a specific example of an image recombination processing circuit 300.

Next, a configuration example of the image re-composition processing circuit 300 of FIG. 1 is described with reference to FIG. 3. The image re-composition processing circuit 300 is provided with the frame-interpolated background image signal 108 from the frame interpolation circuit 105, the scale signal-1 103 from the scale buffer-1 221, the mask signal-1 104 from the mask generating circuit-1 209, the scale signal-2 105 from the scale buffer-2 224, and the mask signal-2 106 from the mask generating circuit-2 211.

The image re-composition processing circuit 300 comprises an image compositing circuit-1 306, an image compositing circuit-2 307, and an image selection circuit 308. The image compositing circuit-1 306 combines the transparent image portion with the frame-interpolated background image 108 in accordance with the above Equation 1 and Equation 3, based on the frame-interpolated background image signal 108, the scale signal-1 103, and the mask signal-1 104. On the other hand, the image compositing circuit-2 307 combines the transparent image portion with the frame-interpolated background image 108 in accordance with the above Equation 1 and Equation 5, based on the frame-interpolated background image signal 108, the mask signal-2 105, and the scale signal-2 106. The transparent image is reproduced by the scale signal-1 103 and the mask signal-1 104, or by the scale signal-2 105 and the mask signal-2 106, wherein an area (display portion) where the transparent image portion is to be combined is identified by the scale signal and the signal level thereof is provided by the scale signal.

A signal outputted from the image compositing circuit-1 306, a signal outputted from the image compositing circuit-2 307, and the frame-interpolated background image signal 108 are inputted to the image selection circuit 308, and either one of these signals is selected for each pixel by the image selection circuit 308. This selection is made in response to the mask signal-1 104 or the mask signal-2 106 inputted to the image selection circuit 308. Namely, if the mask signal-1 104 has a value which is not 0, the signal outputted from the image compositing circuit-1 306 is selected, and if the mask signal-2 106 has a value which is not 0, the signal outputted from the image compositing circuit-2 307 is selected, and if the both mask signals are 0, the frame-interpolated background image signal 108 is selected. The signal selected in this manner is supplied as an output signal 309 to the timing control circuit 112.

Next, the process flow of this image processing apparatus is described with reference to FIGS. 7 to 13. In addition, in FIGS. 7 to 13, the process steps are denoted by reference numeral "S".

Figure 7A:
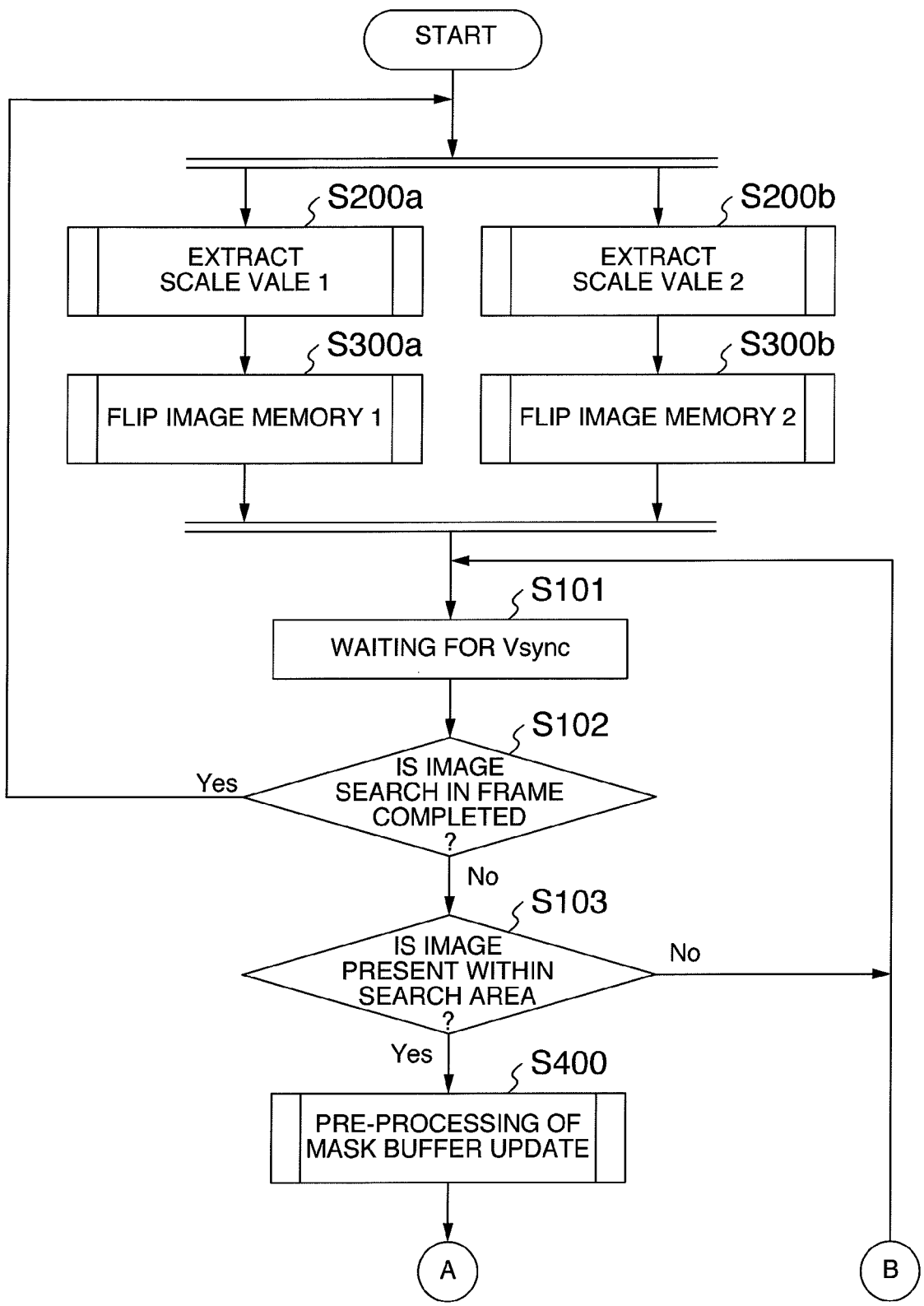
FIGS. 7A and 7B are flowcharts showing the flow of image processing concerning this embodiment.

In FIG. 7A, a scale value extraction process in S200a and S200b is performed by a circuit including the scale extracting circuit-1 213, the scale histogram generator-1 214, the scale buffer-1 221, the scale extracting circuit-2 220, the scale histogram generator-2 219, and the scale buffer-2 224, wherein a scale value is extracted from a prepared scale histogram. FIG. 8 shows the detail of this process in S200a and S200b. In S201 of FIG. 8, it is determined whether or not a histogram of scale signals has been updated, and if not updated, then the process flow proceeds to S204 to select the last scale value, while if it is determined as having been updated in S201, then in S202, a scale value is extracted from a gray scale with the highest number of counts, and then in S203 a median value is extracted along with the scale values from the past histogram. Subsequently, in S205, it is determined whether or not the image memory-1 204 and the image memory-2 207 which are the mask buffers have been flipped (whether the write state and read state of the two buffers have been switched to each other), i.e., whether or not the process flow has reached at the predetermined M-th frame from the beginning of the process. If Yes, then a scale register-1 221 or a scale register-2 224 is flipped, respectively, and an initialization process is performed to the register on the back buffer side (S206). Then, in S207, an average value of scale median values from at the time of flipping (M-th frame) to the present is stored as the scale value into the scale register-1 or the scale register-2.

Figure 9:
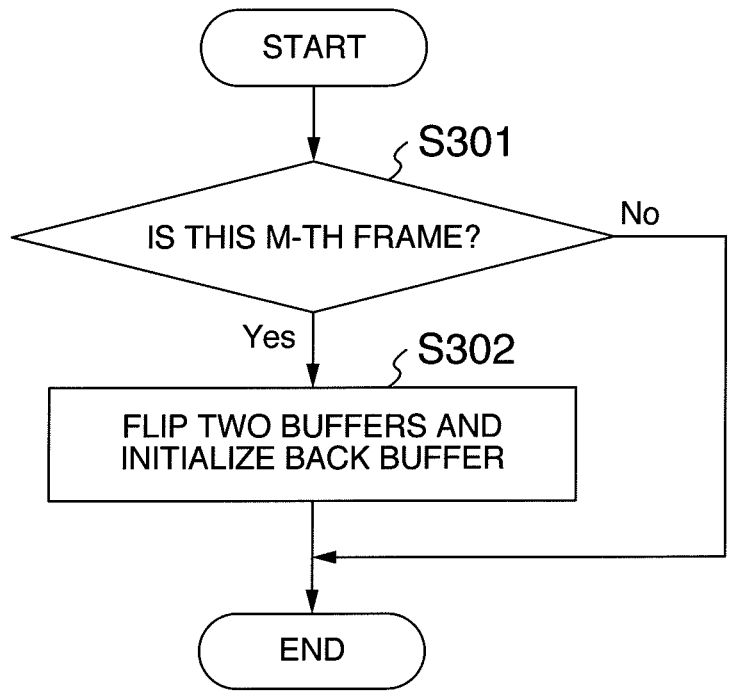
FIG. 9 is a flowchart showing the detailed process of S300 of FIG. 7A.

Processing of the flip value of the image memory in S300a and S200b is performed by a circuit including the memory control circuit-1 208, the image memory-1 204, the memory control circuit-2 212, and the image memory-2 207, and the detail thereof is shown in FIG. 9. In FIG. 9, in S301, the frame number is counted for each frame and it is determined whether or not the frame number has reached the specified frame number M. If Yes, then in S302, the image memory-1 204 and the image memory-2 207 which are two mask buffers are flipped (switched) by the memory control circuit-1 208 and memory control circuit-2 212 to initialize the back buffer.

Figure 10:
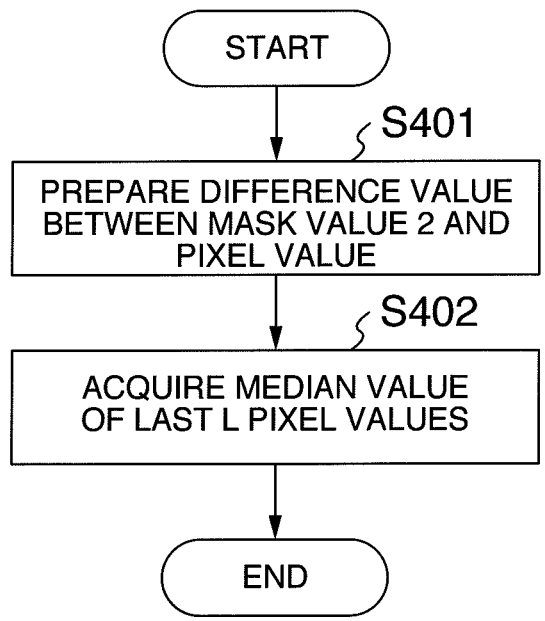
FIG. 10 is a flowchart showing the detailed process of S400 of FIG. 7A.

Upon completion of the processes of the above-described flow charts of FIG. 8 and FIG. 9, the process flow returns to the flow chart of FIG. 7A again, and in S101a vertical synchronizing signal (VSYNC) waiting process is performed. This is performed in order to determine the timings of the processes after S101 that are performed for each frame. Subsequently, in S102, it is determined whether or not the pixel search within a frame has been completed. Here, if it is determined that the search may be completed, then the process flow proceeds to S103 to determine whether or not a noticed pixel is present within a search area. The determination processes in S102 and S103 are for performing the determination of a separation and re-composition processing area for a background image and a transparent image portion, and are performed in a circuit including the area determination circuit 203. In S103, if it is determined that the noticed pixel is present within the search area, then the process flow proceeds to S400 to perform a preprocessing of mask buffer update. This process in S400 is performed in a circuit including the median value generating circuit 210 and the subtractor 240, and the detail thereof is shown in FIG. 10. In S401 of FIG. 10, the difference signal 217 is prepared by subtracting a mask signal from an image signal by the subtractor 240. Then, in S402, a median value is acquired by the median value generating circuit 210. This is a process, in which the last L pixel values are detected by delaying the pixel values by several numbers of clocks in the median value generating circuit 210 and from these L pixel values a median value is acquired.

Figure 7B:
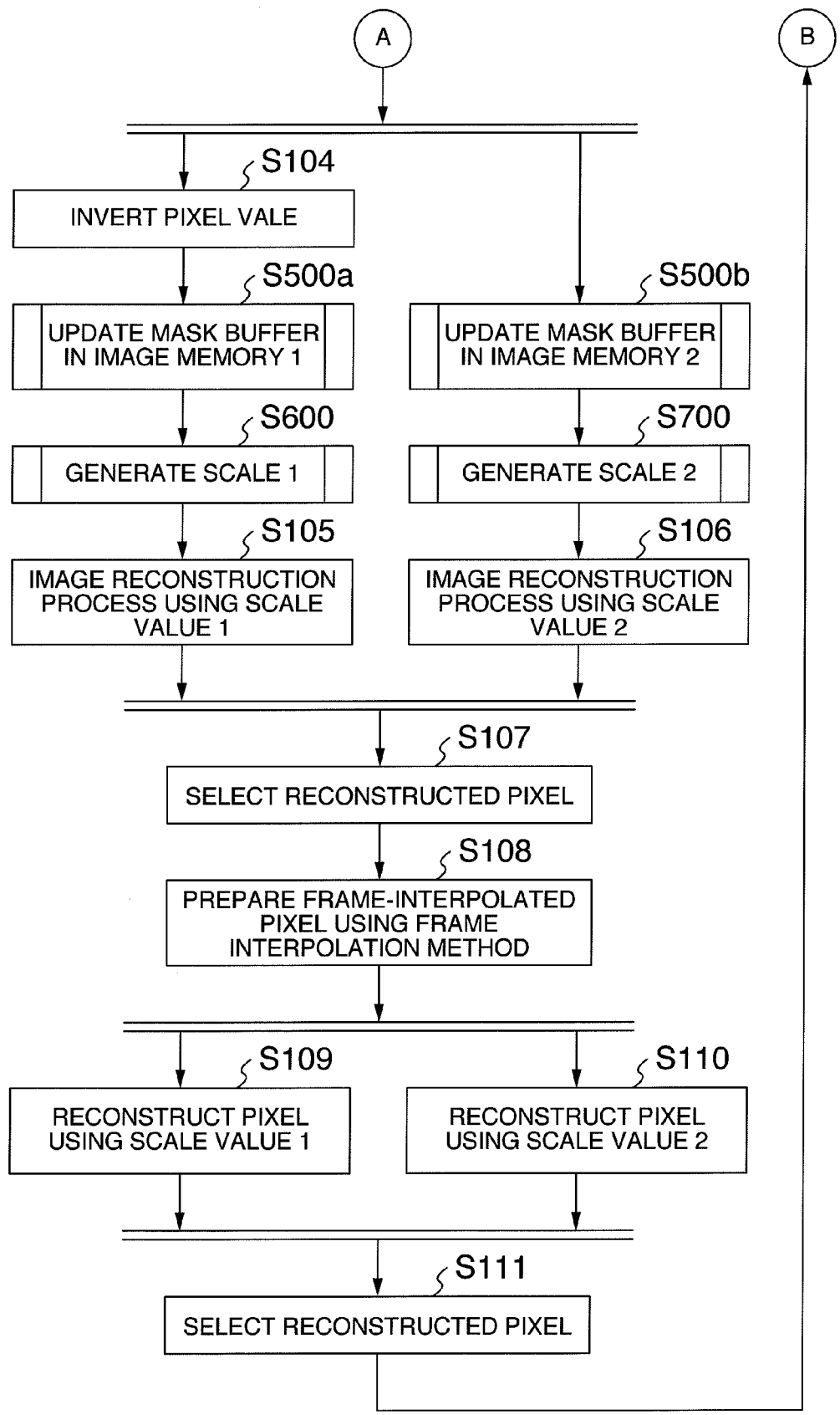

Upon completion of the above-described process of the flow chart of FIG. 10, the process flow proceeds to S104 of FIG. 7B to perform a pixel value inversion process by the image inverting circuit 205. Subsequently, in S500a and S500b, the mask buffer update process is performed. This process is performed in a circuit including the mask generating circuit-1 209, the memory control circuit-1 208, the image memory-1 204, the mask generating circuit-2 211, the memory control circuit-2 212, and the image memory-2 207, and the detail thereof is shown in FIG. 11. In S501 of FIG. 11, first, the memory control circuit-1 208 and the memory control circuit-2 212 acquire a mask signal (mask value) from the image memory-1 204 or the image memory-2 207 which is the mask buffer. Subsequently, in S502, the memory control circuit-1 208 and the memory control circuit-2 212 compare the mask value newly detected in the mask generating circuit-1 209 or the mask generating circuit-2 212 with the mask value acquired from the mask buffer, and replaces either smaller one of them, i.e., the minimum value, as a new mask value. Then, in S503, the memory control circuit-1 208 and memory control circuit-2 212 again store the above-described minimum value as the new mask value into the image memory-1 204 or the image memory-2 207, which is the mask buffer. This is repeatedly performed over a plurality of frames.

Upon completion of the above-described processes of FIG. 11, the process flow proceeds to S600 of FIG. 7B to perform the generation process of the scale signal-1. This process is performed in a circuit including the scale generating circuit-1 215, and the detail thereof is shown in FIG. 12. In S601 of FIG. 12, the scale generating circuit-1 215 first determines whether or not a certain noticed pixel is present in the boundary i of the mask signal-1 104, i.e., in the vicinity of the transparent image portion. If this noticed pixel is present in the vicinity of the boundary i, the process flow proceeds to S602 to prepare a scale value using the mask signal-1 and the median value obtained in the process of FIG. 10. Then, in S603, the count of the gray scale (e.g., 256 gray scales if the scale value is 8 bits) of the scale histogram 1 corresponding to the prepared scale value is updated by one count.

The generation process of the scale signal-2 in S700 of FIG. 7B is performed by a circuit including the scale generating circuit-2 218, and the detail thereof is shown in FIG. 13. In S701 of FIG. 13, the scale generating circuit-2 218 first determines whether or not a certain noticed pixel is present in the boundary i of the mask signal-2 105 (i.e., in the vicinity of the transparent image portion). If this noticed pixel is present in the vicinity of the boundary i, the process flow proceeds to S702 to prepare a scale value using the mask signal-1 and the median value obtained in the process of FIG. 10. Then, in S703, the count of the gray scale of the scale histogram 2 corresponding to the prepared scale value is updated by one count.

In this way, a histogram of scale values is prepared on the low luminance side and on the high luminance side, respectively.

Upon completion of the generation process of the scale signal-1 in S600, the process flow proceeds to S105 to perform the image reconstruction process. This process is performed in a circuit including the scale buffer-1 221 and the image reconstruction circuit-1 222, wherein the image is reconstructed using the mask signal-1 104, the scale signal-1 103, and the difference signal 107.

On the other hand, upon completion of the scale signal-2 generation process in S700, the process flow proceeds to S106 to perform the image reconstruction process. This process is performed in a circuit including the scale buffer-2 224 and the image reconstruction circuit-2 223, wherein the image is reconstructed using the mask signal-2 105 and the scale signal-2 106.

Upon completion of the processes in S105 and S106, the process flow proceeds to S107 to perform the selection process of the reconstructed background image signal by a circuit including the image selection circuit 228. In this process, the selection is performed by giving priority to the input signal which is not 0, i.e., the signal on the high luminance side, among the reconstructed background image signals on the high luminance side and on the low luminance side inputted to the image selection circuit 228. Subsequently, the process flow proceeds to S108, where for the background image signal containing the reconstructed background image signal selected in S107, a process of preparing an interpolation frame using the frame interpolation method as described above is performed in a circuit including the 1V delay circuit 104 and the frame interpolation circuit 105.

Then, the process flow proceeds to S109 to perform an image re-composition process. This process is performed in a circuit including the image compositing circuit-1 306, wherein the high luminance semi-transparent image is recombined with the background image using the frame-interpolated background image signal 108, the mask signal 1, and the scale signal 1. Moreover, similarly, also in S110, the image re-composition process is performed. This process is performed in a circuit including the image compositing circuit-2 307, wherein the low luminance semi-transparent image is recombined with the background image using the frame-interpolated background image signal 108, the mask signal 2, and the scale signal 2.

Finally, in S111, the selection process of the re-composition image is performed by the image selection circuit 308. Here, one image signal among the frame-interpolated background image signal, the composition image signal on the high luminance side, and the composition image signal on the low luminance side is selected for each pixel using the two mask signal-1 and mask signal-2.

This selection is performed in response to the mask signal-1 104 or the mask signal-2 106. For example, if the mask signal-1 104 has a value which is not 0, the composition image signal on the high luminance side is selected, and if the mask signal-2 106 has a value which is not 0, the composition image signal on the low luminance side is selected, and if the both mask signals are 0, it is determined that this is an area not having a transparent image portion, and the frame-interpolated background image signal 108 is selected.

Through the above-described processes, the frame interpolation is performed only to the background image portion, so that the influence on the frame interpolation by the transparent image portion, i.e., the above-described likelihood of false detection of a motion vector can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus, comprising:
an image separation processing section for separating a pixel value of an inputted image signal into a pixel value of a transparent static image portion which has transparency and which remains stationary over a plurality of frames, and a pixel value of a background image by detecting from the inputted image signal a pixel value common among the plurality of frames within the inputted image signal,
wherein the image separation processing section determines that the inputted image signal includes a transparent static image portion by determining whether a portion of the inputted image signal has a constant transparency and remains stationary over a predetermined number of frames;
a frame interpolator that performs frame interpolation using the pixel value of the background image separated in the image separation processing section; and
a composition processing section for combining the pixel value of the background image frame-interpolated by the frame interpolator with the pixel value of the transparent static image portion separated by the image separation processing section.

2. The image processing apparatus according to claim 1, wherein the image separation processing section detects, as a pixel value common among a plurality of frames, the one being stationary over the plurality of frames.

3. The image processing apparatus according to claim 2, wherein the image separation processing section detects the fixed value from pixel values on the same coordinate in a plurality of consecutive frames within the inputted image signal, and extracts, as the transparent image portion, an area including a plurality of the fixed values, thereby separating pixel values of the transparent static image portion.

4. The image processing apparatus according to claim 3, wherein the image separation processing section detects the fixed value by repeatedly acquiring the minimum value of pixel values on the same coordinate in a plurality of consecutive frames within the inputted image signal.

5. The image processing apparatus according to claim 3, wherein the image separation processing section detects the fixed value by repeatedly performing an AND operation of pixel values on the same coordinate in a plurality of consecutive frames within the inputted image signal.

6. The image processing apparatus according to claim 3, wherein the image separation processing section performs detection of the fixed value with respect to a predetermined area within the inputted image signal.

7. The image processing apparatus according to claim 6, wherein a boundary of the predetermined area is discriminated based on whether or not the fixed value is 0, and a scale value for increasing a pixel value of a portion corresponding to the predetermined area of the background image is calculated by using a median value obtained from one or more pixels around the discriminated boundary, and then the background image is reconstructed using this scale value.

8. The image processing apparatus according to claim 7, wherein a histogram obtained by summing the number of the scale values over one frame is prepared for each of the plurality of frames, and a scale value when a distribution of the number of the scale values becomes the maximum is acquired for each histogram, and then the reconstruction is performed using the scale value obtained from this histogram.

9. The image processing apparatus according to claim 8, wherein an average value of median values of the scale values is calculated among a predetermined number of frames, and the average value is used as the scale value during the predetermined frames.

10. The image processing apparatus according to claim 3, wherein the fixed value includes a first fixed value detected from pixel values in the predetermined area and a second fixed value detected from pixel values that are obtained by inverting pixel values in the predetermined area.

11. The image processing apparatus according to claim 1, wherein the transparent static image portion is a semi-transparent character telop.

12. The image processing apparatus according to claim 1, wherein the frame interpolator detects a motion vector indicative of a movement of an object from the background image, and performs the frame interpolation using this motion vector.

13. The image processing apparatus according to claim 1, wherein the transparent static image portion comprises a semi-transparent image having a constant degree of transparency over said plurality of frames.

14. An image processing method, comprising the steps of:
separating a pixel value of an inputted image signal into a pixel value of a static transparent image portion, which has transparency and which remains stationary over a plurality of frames, and a pixel value of a background image by detecting from the inputted image signal a pixel value common among the plurality of frames within the inputted image signal,
wherein the step of separating includes determining that the inputted image signal includes a transparent static image portion by determining whether a portion of the inputted image signal has a constant transparency and remains stationary over a predetermined number of frames;
preparing an interpolation frame using the pixel value of the separated background image, and performing frame interpolation; and
combining the pixel value of the frame-interpolated background image with the pixel value the separated transparent static image portion.

15. The image processing method according to claim 14, wherein the transparent static image portion comprises a semi-transparent image having a constant degree of transparency over said plurality of frames.

16. An image processing apparatus, comprising:
an image separation processing section for separating a pixel value of an inputted image signal into a pixel value of a transparent image portion having transparency and a pixel value of a background image by detecting from the inputted image signal a pixel value common among a plurality of frames within the inputted image signal;
a frame interpolator that performs frame interpolation using the pixel value of the background image separated in the image separation processing section; and
a composition processing section for combining the pixel value of the background image frame-interpolated by the frame interpolator with the pixel value of the transparent image portion separated by the image separation processing section, wherein the image separation processing section detects, as a pixel value common among a plurality of frames, the one being stationary over the plurality of frames, wherein the image separation processing section detects the fixed value from pixel values on the same coordinate in a plurality of consecutive frames within the inputted image signal, and extracts, as the transparent image portion, an area including a plurality of the fixed values, thereby separating pixel values of the transparent image portion, wherein the image separation processing section performs detection of the fixed value with respect to a predetermined area within the inputted image signal, and wherein a boundary of the predetermined area is discriminated based on whether or not the fixed value is 0, and a scale value for increasing a pixel value of a portion corresponding to the predetermined area of the background image is calculated by using a median value obtained from one or more pixels around the discriminated boundary, and then the background image is reconstructed using this scale value.

17. The image processing apparatus according to claim 16, wherein a histogram obtained by summing the number of the scale values over one frame is prepared for each of the plurality of frames, and a scale value when a distribution of the number of the scale values becomes the maximum is acquired for each histogram, and then the reconstruction is performed using the scale value obtained from this histogram.

18. The image processing apparatus according to claim 17, wherein an average value of median values of the scale values is calculated among a predetermined number of frames, and the average value is used as the scale value during the predetermined frames.

* * * * *